US012614499B2

(12) United States Patent
Park

(10) Patent No.: US 12,614,499 B2
(45) Date of Patent: Apr. 28, 2026

(54) ELECTRONIC DEVICE AND METHOD FOR CONFIGURING SCREEN ON BASIS OF ACQUIRED INFORMATION

(71) Applicant: SAMSUNG ELECTRONICS CO., LTD., Suwon-si (KR)

(72) Inventor: Jinsol Park, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/629,258

(22) Filed: Apr. 8, 2024

(65) Prior Publication Data

US 2024/0257697 A1     Aug. 1, 2024

Related U.S. Application Data

(63) Continuation of application No. PCT/KR2022/015736, filed on Oct. 17, 2022.

(30) Foreign Application Priority Data

Dec. 13, 2021     (KR) ........................ 10-2021-0177664

(51) Int. Cl.
*G09G 3/20*          (2006.01)
*G01S 13/42*         (2006.01)

(52) U.S. Cl.
CPC ............ *G09G 3/2092* (2013.01); *G01S 13/42* (2013.01)

(58) Field of Classification Search
None
See application file for complete search history.

(56) References Cited

U.S. PATENT DOCUMENTS 8,634,674 B2     1/2014   Hanechak
9,317,890 B2     4/2016   Canan et al.
(Continued)

FOREIGN PATENT DOCUMENTS

CN         103491230 A  *  1/2014
CN         107767839 A  *  3/2018   ........... G06F 3/0487
(Continued)

OTHER PUBLICATIONS

International Search Report, PCT/ISA/210, dated Jan. 31, 2023, in PCT/KR2022/015736.
(Continued)

*Primary Examiner* — Kirk W Hermann
(74) *Attorney, Agent, or Firm* — STASS & HALSEY LLP

(57)          ABSTRACT

At least one processor of an electronic device to: identify first information in memory, the first information including information about one or more objects included in each of a plurality of pieces of content, and information indicating the emotion type for each of the plurality of pieces of content; acquire second information indicating the illuminance of the external environment in which the electronic device is present; acquire third information about the location of a user; input the first information, the second information, and the third information to a first model to acquire fourth information including one or more pieces of content to be displayed on a display among the plurality of pieces of content, and one or more areas in which the one or more pieces of content are to be respectively arranged; and display the one or more pieces of content in the one or more areas, respectively.

18 Claims, 13 Drawing Sheets

(56) References Cited

U.S. PATENT DOCUMENTS

| | | | |
|---|---|---|---|
| 10,025,419 B2 | 7/2018 | Seo et al. | |
| 10,133,482 B2 | 11/2018 | Ferren | |
| 10,347,221 B2 | 7/2019 | Lee et al. | |
| 10,891,013 B2 | 1/2021 | Miura et al. | |
| 11,188,708 B2 | 11/2021 | Kim et al. | |
| 11,355,089 B2 | 6/2022 | Jang et al. | |
| 2015/0040031 A1 | 2/2015 | Lee et al. | |
| 2015/0213331 A1* | 7/2015 | Peng | G06F 18/22 |
| | | | 382/165 |
| 2016/0358311 A1* | 12/2016 | Chen | G06F 40/151 |
| 2020/0013371 A1* | 1/2020 | Yang | G06T 7/0002 |
| 2020/0125158 A1* | 4/2020 | Giusti | G01S 13/04 |
| 2020/0160034 A1 | 5/2020 | Choi et al. | |
| 2020/0242195 A1* | 7/2020 | Souche | G06F 40/103 |
| 2021/0304648 A1 | 9/2021 | Song et al. | |
| 2021/0327394 A1* | 10/2021 | Bui | G06F 1/3231 |
| 2022/0122344 A1* | 4/2022 | Liu | G06V 10/751 |
| 2023/0360437 A1* | 11/2023 | Shin | G06T 7/10 |

FOREIGN PATENT DOCUMENTS

| | | |
|---|---|---|
| EP | 2 466 869 A2 | 6/2012 |
| JP | 2010-177179 | 8/2010 |
| JP | 2020-187514 | 11/2020 |
| KR | 10-1370795 | 3/2014 |
| KR | 10-2015-0017015 | 2/2015 |
| KR | 10-1612311 | 4/2016 |
| KR | 10-2017-0051950 | 5/2017 |
| KR | 10-1920323 | 11/2018 |
| KR | 10-2019-0034021 | 4/2019 |
| KR | 10-2019-0100097 | 8/2019 |
| KR | 10-2083696 | 3/2020 |
| KR | 10-2020-0035567 | 4/2020 |
| KR | 10-2124285 | 6/2020 |
| KR | 10-2020-0099845 | 8/2020 |
| KR | 10-2021-0011162 | 2/2021 |
| KR | 10-2021-0101416 | 8/2021 |

OTHER PUBLICATIONS

Written Opinion, PCT/ISA/237, dated Jan. 31, 2023, in PCT/KR2022/015736.

Office Action dated Feb. 5, 2026, in Korean Application No. 10-2021-0177664.

* cited by examiner

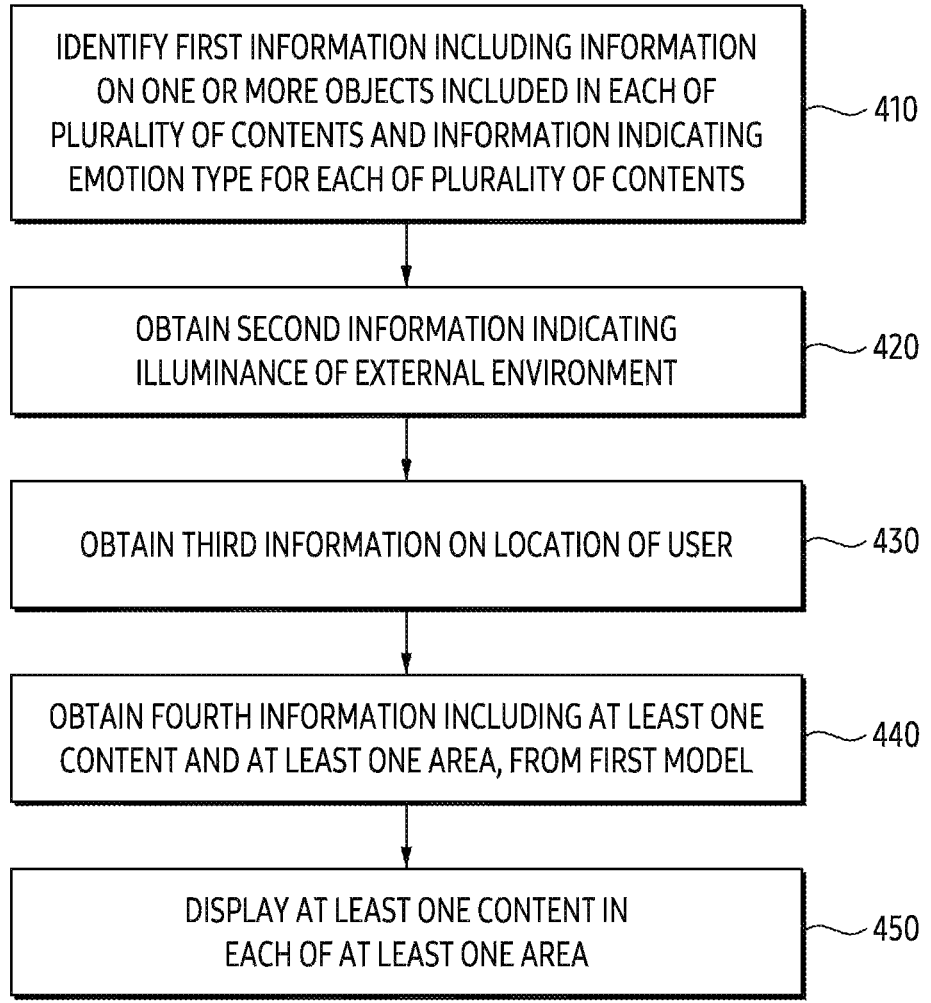

IDENTIFY FIRST INFORMATION INCLUDING INFORMATION ON ONE OR MORE OBJECTS INCLUDED IN EACH OF PLURALITY OF CONTENTS AND INFORMATION INDICATING EMOTION TYPE FOR EACH OF PLURALITY OF CONTENTS ⸯ 410

OBTAIN SECOND INFORMATION INDICATING ILLUMINANCE OF EXTERNAL ENVIRONMENT ⸯ 420

OBTAIN THIRD INFORMATION ON LOCATION OF USER ⸯ 430

OBTAIN FOURTH INFORMATION INCLUDING AT LEAST ONE CONTENT AND AT LEAST ONE AREA, FROM FIRST MODEL ⸯ 440

DISPLAY AT LEAST ONE CONTENT IN EACH OF AT LEAST ONE AREA ⸯ 450

FIG. 4

| RESOLUTION (610) | BRIGHTNESS (602) | NUMBER OF OBJECTS (603) | TYPE OF OBJECT (604) | EMOTION TYPE (605) |
|---|---|---|---|---|
| HD | 0 | 1 | Human | Happy |
| FHD | 1 | 2 | Animal | Sad |
| QHD | 2 | 3 | Mountain | Calm |
| 4K | 3 | 4 | Sea | Intense |
| 8K | 4 | 5 | Tree | Quiet |
| ... | ... | ... | ... | ... |

FIG. 6A

| ILLUMINANCE [lux] (611) |
|---|
| 0.01 |
| 1 |
| 2 |
| 5 |
| 10 |
| ... |

FIG. 6B

| DISTANCE (621) [cm] | MOTION (622) |
|---|---|
| 50 | 0 |
| 100 | 1 |
| 200 | 2 |
| 300 | 3 |
| 400 | 4 |
| ... | ... |

FIG. 6C

| SIZE OF DISPLAY [inch] (631) | SIZE OF ACTUAL OBJECT [$cm^2$] (632) |
|---|---|
| 10 | 1 |
| 20 | 4 |
| 40 | 16 |
| 80 | 64 |
| 160 | 256 |
| ... | ... |

FIG. 6D

RECEIVE AT LEAST ONE SIGNAL FROM EXTERNAL ELECTRONIC DEVICE RELATED TO USER, USING COMMUNICATION CIRCUIT ~ 710

OBTAIN THIRD INFORMATION INCLUDING INFORMATION INDICATING DISTANCE BETWEEN ELECTRONIC DEVICE AND USER AND INFORMATION INDICATING MOTION OF USER, BASED ON AT LEAST ONE SIGNAL ~ 720

```
IDENTIFY THAT AT LEAST ONE OF SECOND INFORMATION
AND THIRD INFORMATION IS CHANGED, WHILE AT LEAST          ~ 910
ONE CONTENT IS DISPLAYED IN EACH OF AT LEAST ONE AREA

↓

CHANGE AT LEAST ONE DISPLAYED CONTENT TO AT LEAST         ~ 920
ONE OTHER CONTENT AMONG PLURALITY OF CONTENT
```

ELECTRONIC DEVICE AND METHOD FOR CONFIGURING SCREEN ON BASIS OF ACQUIRED INFORMATION

CROSS-REFERENCE TO RELATED APPLICATIONS

This application is a continuation application of International Application No. PCT/KR2022/015736, filed Oct. 17, 2022, which is incorporated herein by reference in its entirety, and claims foreign priority to Korean Application No. 10-2021-0177664, filed Dec. 13, 2021, which is incorporated herein by reference in its entirety.

BACKGROUND

Field

The following descriptions relate to an electronic device and a method for configuring a screen on basis of acquired information.

Description of Related Art

An electronic device may display a plurality of images obtained from a user. The electronic device may display the plurality of images by disposing the plurality of images in a predetermined layout. In other words, the electronic device may display the plurality of images through a fixed layout.

An electronic device displays a plurality of images through a predetermined layout regardless of a position of a user, a state of the user, and/or a type of an image. Based on the position of the user, the state of the user, and/or the type of the image, a method for identifying (or determining) at least one area where the plurality of images are displayed and the plurality of images to be displayed may be required.

The technical problems to be achieved in this document are not limited to those described above, and other technical problems not mentioned herein will be clearly understood by those having ordinary knowledge in the art to which the present disclosure belongs, from the following description.

SUMMARY

An electronic device according to various embodiments may include a display, an illuminance sensor, a position identification circuit for identifying a position of a user, a memory storing a plurality of contents, and at least one processor configured to identify, from the memory, first information including information on one or more objects comprised in each of the plurality of contents and information indicating an emotion type for each of the plurality of contents, obtain, using the illuminance sensor, second information indicating illuminance of an external environment where the electronic device located, obtain, using the position identification circuit, third information on the position of the user, by inputting the first information, the second information, and the third information to a first model indicated by a plurality of parameters, stored in the memory, obtain, from the first model, fourth information including at least one content to be displayed on the display among the plurality of contents and at least one area in which each of the at least one content is to be disposed, and display, based on the fourth information, the at least one content on each of the at least one area.

According to various embodiments, the at least one processor may be further be configured to identify that at least one of the second information and the third information is changed while the at least one content is displayed on each of the at least one area, and based on identifying that at least one of the second information and the third information is changed, change the at least one content which is displayed to at least one other content among the plurality of contents.

According to various embodiments, the at least one processor may be configured to receive the plurality of contents from an external electronic device connected to the electronic device, and store the received plurality of contents in the memory.

According to various embodiments, the first information may further include resolution for each of the plurality of contents and brightness for each of the plurality of contents.

According to various embodiments, the at least one processor may further be configured to obtain information on one or more objects included in each of the plurality of contents, by inputting a plurality of images to a second model distinct to the first model.

According to various embodiments, the information on the one or more objects comprised in each of the plurality of contents may include a type of the one or more objects comprised in each of the plurality of contents and a number of the one or more objects comprised in each of the plurality of contents.

According to various embodiments, the at least one processor may further be configured to obtain the information indicating the emotion type for each of the plurality of contents, by inputting the plurality of images to a third model distinct to the first model and the second model.

According to various embodiments, the at least one processor may be configured to obtain the fourth information by inputting, to the first model, fifth information including a size of the display and a size of at least one content displayed based on the size of the display, with the first information, the second information, and the third information.

According to various embodiments, the position identification circuit may include a communication circuit, and the at least one processor may be configured to receive, using the communication circuit, at least one signal from an external electronic device related to the user, and based on the received at least one signal, obtain the third information including information indicating a distance between the electronic device and the user and information indicating a motion of the user.

According to various embodiments, the position identification circuit may include a radar sensor, and the at least one processor nay be configured to transmit at least one signal using the radar sensor, receive, using the radar sensor, at least one reflection signal caused by the user, and based on the at least one reflection signal, obtain the third information including information indicating a distance between the electronic device and the user and information indicating a motion of the user.

According to various embodiments, the at least one processor may be configured to obtain the third information including azimuth of a location of the user relative to the electronic device, using the position identification circuit, wherein a first area and a second area among the at least one area are divided based on the azimuth of the location of the user, and wherein a size of the first area, which is related to a direction formed based on the azimuth, is larger than the size of the second area.

According to various embodiments, the at least one processor may further be configured to train the first model by changing the plurality of parameters to reduce a number of the at least one area as a distance between the electronic device and the user increases.

A method of an electronic device according to various embodiments may include identifying, from a memory, first information including information on one or more objects comprised in each of a plurality of contents and information indicating an emotion type for each of the plurality of contents, obtaining, using an illuminance sensor, second information indicating illuminance of an external environment where the electronic device located, obtaining, using a position identification circuit, third information on a position of a user, by inputting the first information, the second information, and the third information to a first model indicated by a plurality of parameters, stored in the memory, obtaining, from the first model, fourth information including at least one content to be displayed on a display among the plurality of contents and at least one area in which each of the at least one content is to be disposed, and displaying, based on the fourth information, the at least one content on each of the at least one area.

The method may further include identifying that at least one of the second information and the third information is changed while the at least one content is displayed on each of the at least one area, and based on identifying that at least one of the second information and the third information is changed, changing the at least one content which is displayed to at least one other content among the plurality of contents.

A non-transitory computer readable storage medium according to various embodiments, wherein the one or more programs, when being executed by a processor of an electronic device with a display, an illuminance sensor, and a position identification circuit, may store one or more programs including instructions causing the electronic device to identify, from the memory, first information including information on one or more objects comprised in each of a plurality of contents and information indicating an emotion type for each of the plurality of contents, obtain, using the illuminance sensor, second information indicating illuminance of an external environment where the electronic device located, obtain, using the position identification circuit, third information on a position of a user, by inputting the first information, the second information, and the third information to a first model indicated by a plurality of parameters, stored in the memory, obtain, from the first model, fourth information including at least one content to be displayed on the display among the plurality of contents and at least one area in which each of the at least one content is to be disposed, and display, based on the fourth information, the at least one content on each of the at least one area.

Advantageous Effects

According to an embodiment, an electronic device can identify first information including information on one or more objects included in each of a plurality of contents and information indicating an emotion type for each of the plurality of contents from a memory. The electronic device can obtain second information indicating illuminance of an external environment. The electronic device can obtain third information on a position of a user. The electronic device can obtain fourth information including at least one content to be displayed on a display and at least one area in which each of the at least one content is to be disposed by inputting the first information to the third information to a first model.

The effects that can be obtained from the present disclosure are not limited to those described above, and any other effects not mentioned herein will be clearly understood by those having ordinary knowledge in the art to which the present disclosure belongs, from the following description.

BRIEF DESCRIPTION OF THE DRAWINGS

FIG. 4 is a flowchart illustrating an operation of an electronic device according to various embodiments.

FIG. 6A illustrates an example of information included in first information according to various embodiments.

FIG. 6B illustrates an example of information included in second information according to various embodiments.

FIG. 6C illustrates an example of information included in third information according to various embodiments.

FIG. 6D illustrates an example of information included in additional information according to various embodiments.

FIG. 10 illustrates another operation of an electronic device according to various embodiments.

DETAILED DESCRIPTION

Figure 1:
FIG. 1 is a block diagram of an electronic device in a network environment according to various embodiments.

FIG. 1 illustrates an example of an electronic device for displaying at least one content according to various embodiments.

Referring to FIG. 1, an electronic device 101 may be used to display the at least one content. For example, the electronic device 101 may display the at least one content through a display. For example, the electronic device 101 may include a television (TV), a video wall, and/or an electronic picture frame. For example, the electronic device 101 may include a Set-Top Box (STB) that provides video and/or voice to another electronic device such as the TV.

According to an embodiment, the electronic device 101 may divide a screen 110 displayed through the display into at least one area. For example, the screen 110 may be divided into the at least one area. For example, the screen 110 may include the at least one area. For example, the at least one area may include a first area 110-1, a second area 110-2, and a third area 110-3. The screen 110 may be divided into the first area 110-1, the second area 110-2, and the third area 110-3.

For example, each of the first area 110-1, the second area 110-2, and the third area 110-3 may be used to display one content. The first area 110-1 may be used to display a first content among the at least one content. A processor 410 may display the first content among the at least one content in the first area 110-1. The second area 110-2 may be used to display a second content among the at least one content. The processor 410 may display the second content among the at least one content in the second area 110-2. The third area 110-3 may be used to display a third content among the at least one content. The processor 410 may display the third content among the at least one content in the third area 110-3.

According to an embodiment, the electronic device 101 may change the number or configuration of the at least one area based on a designated condition. The electronic device 101 may change the at least one content displayed in the at least one area based on the designated condition. Operation of the electronic device 101 according to the embodiment or a processor included in the electronic device 101 may be described below.

Figure 2:
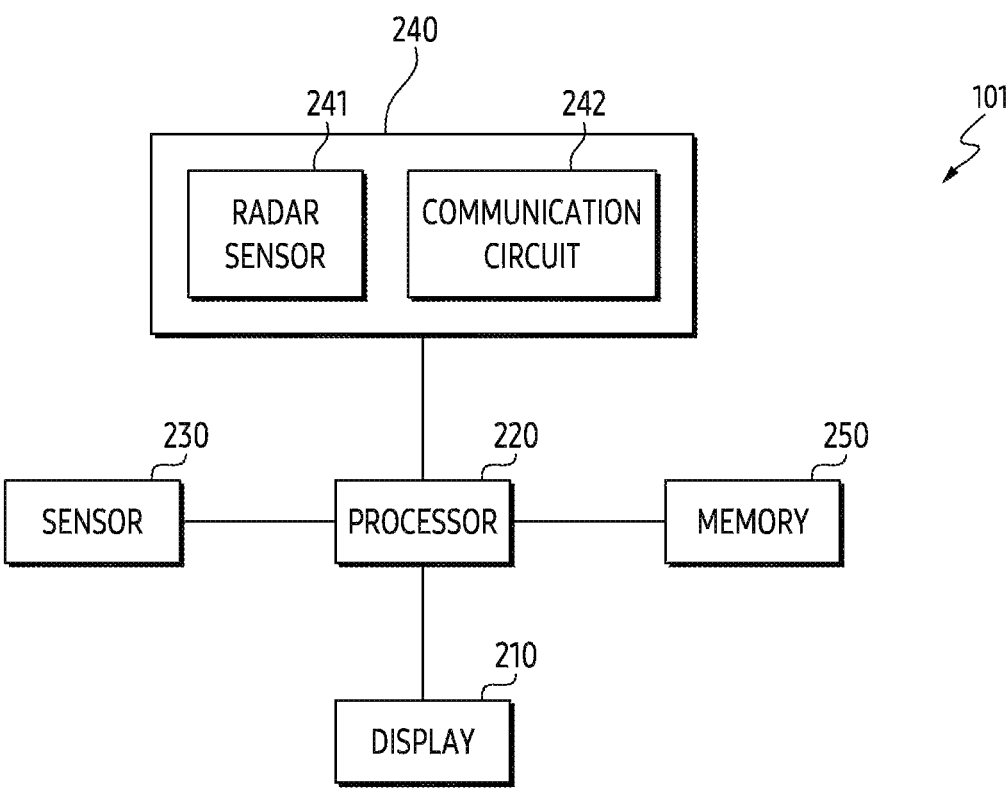
FIG. 2 is a simplified block diagram of an electronic device according to various embodiments.

FIG. 2 is a simplified block diagram of an electronic device according to various embodiments.

Referring to FIG. 2, an electronic device 101 may correspond to the electronic device 101 of FIG. 1. The electronic device 101 may include a display 210, a processor 220, a sensor 230, and/or a position identification circuit 240. According to an embodiment, the electronic device 101 may include at least one of the display 210, the processor 220, the sensor 230, and the position identification circuit 240. For example, at least some of the display 210, the processor 220, the sensor 230, and the position identification circuit 240 may be omitted according to an embodiment.

According to an embodiment, the processor 220 may be operatively coupled with or connected with the display 210, the sensor 230, and the position identification circuit 240. For example, the processor 220 may control the display 210, the sensor 230, and the position identification circuit 240. The display 210, the sensor 230, and the position identification circuit 240 may be controlled by the processor 220. For example, the processor 220 may be configured with at least one processor. The processor 220 may include the at least one processor.

According to an embodiment, the processor 220 may include a hardware component for processing data based on one or more instructions. The hardware component for processing data may include, for example, an Arithmetic and Logic Unit (ALU), a Field Programmable Gate Array (FPGA), and/or a Central Processing Unit (CPU).

According to an embodiment, the processor 220, for example, may control at least one other component (e.g., hardware or software component) of the electronic device 101 connected to the processor 220 by executing software, and may perform various data processing or operations. According to an embodiment, as at least portion of data processing or operation, the processor 220 may store a command or data received from the other component (e.g., the sensor 230) in a memory 250 (e.g., a volatile memory), may process the command or data stored in the memory 250 (e.g., the volatile memory), and may store the result data in the memory 250 (e.g., a non-volatile memory). According to an embodiment, the processor 220 may include a main processor (e.g., a central processing unit or application processor) or an auxiliary processor (e.g., a graphics processing unit, a neural processing unit (NPU), an image signal processor, a sensor hub processor, or a communication processor) that may be operated independently or together with it.

According to an embodiment, the auxiliary processor (e.g., the neural processing unit) may include a hardware structure specialized for processing an artificial intelligence model. The artificial intelligence model may be created through machine learning. Such learning, for example, may be performed in the electronic device 101 itself on which the artificial intelligence model is performed, or may be performed through a separate server. A learning algorithm may include, for example, supervised learning, unsupervised learning, semi-supervised learning, or reinforcement learning, but is not limited to the example described above. The artificial intelligence model may include a plurality of artificial neural network layers. The artificial neural network may be one of a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-networks, or a combination of two or more of the above, but is not limited to the example described above. In addition to the hardware structure, the artificial intelligence model may additionally or alternatively include a software structure.

According to an embodiment, the electronic device 101 may include the display 210. The display 210 may be used to display various screens. For example, the display 210 may be used to output content (e.g., an image or video), data, or a signal through a screen. For example, the display 210 may display a screen processed by the processor 220. For example, the display 210 may be divided into at least one area in which at least one content determined by the processor 220 is disposed. For example, a screen displayed through the display 210 may be divided into the at least one area in which the at least one content determined by the processor 220 is disposed.

According to an embodiment, the electronic device 101 may include the sensor 230. The sensor 230 may be used to obtain various external information. The sensor 230 may be configured with at least one sensor. The sensor 230 may include the at least one sensor. For example, the sensor 230 may include an illuminance sensor. The illuminance sensor may be used to obtain information indicating illuminance of an external environment where the electronic device 101 is located. For another example, the sensor 230 may include a biometric sensor. The biometric sensor may be used to obtain biometric information on a user of the electronic device 101.

According to an embodiment, the electronic device 101 may include the position identification circuit 240. The position identification circuit 240 may include configurations of various electronic devices 101 for identifying (or obtaining) information on the position of the user. For example, the position identification circuit 240 may mean a logical configuration rather than a physical configuration. The position identification circuit 240 may include at least some sensor included in the sensor 230. For example, the position identification circuit 240 may include a radar sensor 241 and/or a communication circuit 242. The position identification circuit 240 may further include various configurations for identifying information on the position of the user, as well as the radar sensor 241 and the communication circuit 242. For example, the position identification circuit 240 may include a LiDAR sensor.

For example, the radar sensor 241 may transmit at least one signal and may identify the position of the user based on a reflection signal for the at least one signal. The radar sensor 241 may identify (or obtain) information for indicating a distance between the electronic device 101 and the user. The radar sensor 241 may identify (or obtain) information for indicating motion of the user as well as the information for indicating the distance between the electronic device 101 and the user. The processor 220 may identify (or obtain) the information for indicating the distance between the electronic device 101 and the user and/or the information for indicating the motion of the user through the radar sensor 241.

For another example, the communication circuit 242 may be used for various radio access technologies (RATs). For example, the communication circuit 242 may be used to perform bluetooth communication, bluetooth low energy (BLE) communication, ZigBee communication, or wireless local area network (WLAN) communication. For another example, the communication circuit 242 may be used to perform cellular communication. For example, the processor 220 may establish a connection with an external electronic device through the communication circuit 242. For example, the communication circuit 242 may identify (or obtain) information indicating a distance between the electronic device 101 and a user related to the external electronic device, based on a signal received from an external electronic device related to the user. For example, the external electronic device may operate by being worn by the user. According to an embodiment, the communication circuit 242 may identify (or obtain) the information for indicating the motion of the user as well as information for indicating the distance between the electronic device 101 and the user.

According to an embodiment, the electronic device 101 may include the memory 250. For example, the memory 250 may be used to store a plurality of contents obtained from the user. For example, the memory 250 may be used to store at least one model indicated by a plurality of parameters. For example, the memory 250 may include a hardware component for storing data and/or an instruction inputted and/or outputted to the processor 220. The memory 250 may include, for example, the volatile memory such as a random-access memory (RAM) and/or the non-volatile memory such as a read-only memory (ROM). The volatile memory may include, for example, at least one of dynamic RAM (DRAM), static RAM (SRAM), Cache RAM, and pseudo SRAM (PSRAM). The non-volatile memory may include, for example, at least one of programmable ROM (PROM), erasable PROM (EPROM), electrically erasable PROM (EEPROM), flash memory, hard disk, compact disk, and embedded multi media card (eMMC).

Figure 3:
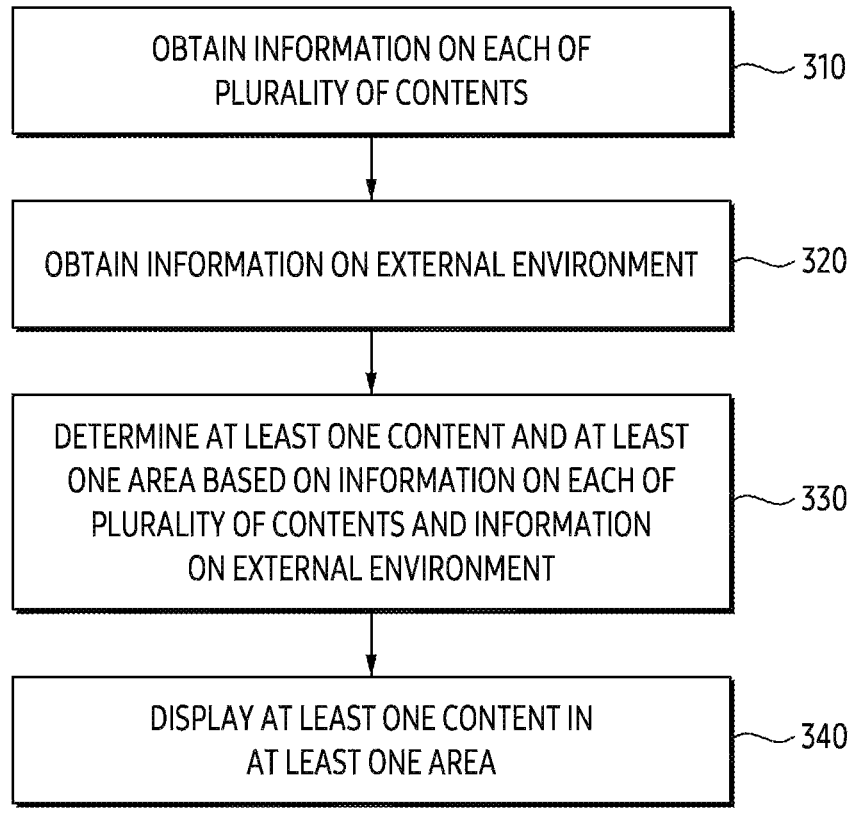
FIG. 3 is a flowchart illustrating an operation of an electronic device according to various embodiments.

FIG. 3 is a flowchart illustrating an operation of an electronic device according to various embodiments. This method may be executed by an electronic device 101 and a processor 220 of the electronic device 101 illustrated in FIGS. 1 and 2.

Referring to FIG. 3, the processor 220 may obtain information on each of a plurality of contents. For example, the plurality of contents may include an image, a video (or moving image), and/or an advertisement.

According to an embodiment, the processor 220 may identify a plurality of content stored in the memory 250. The processor 220 may obtain information on each of the plurality of contents stored in the memory 250. For example, the processor 220 may receive the plurality of contents from an external electronic device connected to the electronic device 101. The processor 220 may receive the plurality of contents through wired communication or wireless communication. The processor 220 may store the plurality of received contents in the memory 250.

For example, the processor 220 may obtain the plurality of contents based on a user input. The processor 220 may obtain the plurality of contents from an external electronic device based on a user input. The processor 220 may store the plurality of obtained contents in the memory 250.

According to an embodiment, the processor 220 may obtain the information on each of the plurality of contents based on the plurality of contents. For example, the processor 220 may obtain the information on each of the plurality of contents based on a model indicated by a plurality of parameters. For example, the information on each of the plurality of contents may include information on resolution and/or brightness of each of the plurality of contents. For example, the information on each of the plurality of contents may include information on one or more objects comprised in each of the plurality of contents and/or information indicating an emotion type for each of the plurality of contents.

In operation 320, the processor 220 may obtain information on an external environment. For example, the processor 220 may obtain the information on the external environment, using a sensor 230 or a position identification circuit 240. The processor 220 may obtain information indicating illuminance of the external environment, using an illuminance sensor. The processor 220 may obtain information on a location of a user, using a communication circuit 242. The processor 220 may obtain the information on the location of the user, using a radar sensor 241.

In operation 330, the processor 220 may determine (or identify) at least one content and at least one area based on the information on each of the plurality of contents and the information on the external environment. For example, the processor 220 may determine (or identify) at least one content among the plurality of contents and at least one area in which each of the at least one content is to be disposed, based on the information on each of the plurality of contents and the information on the external environment.

For example, the processor 220 may determine the at least one content and the at least one area based on the model indicated by the plurality of parameters. The processor 220 may obtain (or identify) information on the at least one content and the at least one area based on the model indicated by the plurality of parameters. For example, the model for obtaining the information on the at least one content and the at least one area may be distinct to a model for obtaining the information on each of the plurality of content. For example, the processor 220 may obtain the information on the at least one content and the at least one area based on a first model. The processor 220 may obtain the information on each of the plurality of contents based on a second model or a third model.

The first to third models may be indicated by a plurality of parameters related to a neural network. Each of the first to third models may include a set of parameters related to the neural network. The neural network is a recognition model implemented in software or hardware that imitates a computational ability of a biological system using a large number of artificial neurons (or nodes). The neural network may perform human cognitive action or learning process through the artificial neurons. For example, the parameters related to the neural network may represent a plurality of nodes included in the neural network and/or a weight assigned to a connection between the plurality of nodes.

In operation 340, the processor 220 may divide a screen displayed through a display 210 into the at least one area. The processor 220 may configure the at least one area in the screen displayed through the display 210. The at least one area may be referred to as a layout for the at least one content.

For example, each of the at least one content may be disposed in the at least one area. The at least one content may be displayed through the display 210 of the electronic device 101 by being disposed in the at least one area. The processor 220 may display the at least one content through the display 210 of the electronic device 101 by disposing each of the at least one content in the at least one area.

According to an embodiment, the processor 220 may set the number of the at least one content to be greater than the number of the at least one area. The processor 220 may display a portion of at least one content on the at least one area. The processor 220 may display another portion of the at least one content on the at least one area according to a designated condition. For example, the processor 220 may change the at least one content displayed in the at least one area according to a designated period. For another example, the processor 220 may change the at least one content displayed in the at least one area according to a designated time.

FIG. 4 is a flowchart illustrating an operation of an electronic device according to various embodiments. This method may be executed by an electronic device 101 and a processor 220 of the electronic device 101 illustrated in FIGS. 1 and 2.

In operation 410, the processor 220 may identify first information including information on one or more objects included in each of a plurality of contents and information indicating an emotion type for each of the plurality of contents. For example, the processor 220 may identify the first information including the information on one or more objects included in each of the plurality of contents and the information indicating the emotion type for each of the plurality of contents from a memory 250.

According to an embodiment, the first information including the information on one or more objects included in each of the plurality of contents and the information indicating the emotion type for each of the plurality of contents may be stored in the memory 250. For example, the processor 220 may obtain the first information including the information on one or more objects included in each of the plurality of contents and the information indicating the emotion type for each of the plurality of contents, based on a plurality of images.

For example, the processor 220 may obtain the information on one or more objects included in each of the plurality of contents based on a second model. The processor 220 may obtain the information on one or more objects included in each of the plurality of contents from the second model, by inputting the plurality of images to the second model. The information on one or more objects included in each of the plurality of contents may include a type of one or more objects and/or the number of one or more objects. The processor 220 may identify the type of one or more objects and/or the number of one or more objects based on the second model. The processor 220 may store the information on one or more objects included in each of the plurality of contents obtained based on the second model in the memory 250. The processor 220 may identify the information on one or more objects included in each of the plurality of contents stored in the memory 250.

For example, the processor 220 may obtain the information indicating the emotion type for each of the plurality of contents based on a third model. The processor 220 may obtain the information indicating the emotion type for each of the plurality of contents from the third model, by inputting the plurality of images to the third model. For example, the information indicating the emotion type for each of the plurality of contents may be obtained based on emotion of one or more objects (e.g., people) included in each of the plurality of contents. For another example, the information indicating the emotion type for each of the plurality of contents may be obtained based on a color, saturation, and/or brightness of each of the plurality of contents. The processor 220 may store the information indicating the emotion type for each of the plurality of contents, obtained based on the third model, in the memory 250. The processor 220 may identify the information indicating the emotion type for each of the plurality of contents stored in the memory 250.

According to the embodiment, the first information may further include resolution (or information on the resolution) for each of the plurality of content and/or brightness (or information on the brightness) for each of the plurality of content, as well as the information on one or more objects included in each of the plurality of contents and the information indicating the emotion type for each of the plurality of contents.

In operation 420, the processor 220 may obtain (or identify) second information indicating illuminance of an external environment. The processor 220 may obtain the second information indicating the illuminance of the external environment, using a sensor 230 (e.g., an illuminance sensor). For example, the second information indicating the illuminance of the external environment may include an illuminance value (unit: lux) of the external environment.

In operation 430, the processor 220 may obtain (or identify) third information on a location of a user. For example, the processor 220 may obtain the third information on the location of the user, using a position identification circuit 240.

For example, the processor 220 may obtain the third information on the location of the user using a radar sensor 241. For another example, the processor 220 may obtain the third information on the location of the user using a communication circuit 242.

According to an embodiment, the third information may include information indicating a distance between the electronic device 101 and the user and/or information indicating motion of the user. The processor 220 may obtain the information indicating the distance between the electronic device 101 and the user and/or the information indicating the motion of the user, using the position identification circuit 240 (e.g., the radar sensor 241 or the communication circuit 242).

In operation 440, the processor 220 may obtain fourth information including at least one content and at least one area, from a first model. For example, the processor 220 may obtain fourth information including at least one content to be displayed on a display 210 among the plurality of contents and at least one area in which each of the at least one content is to be disposed, from the first model, by inputting first information, second information, and third information to the first model indicated by a plurality of parameters stored in the memory 250.

According to an embodiment, the first model indicated by the plurality of parameters may be stored in the memory 250. The first model may be indicated by the plurality of parameters. For example, the processor 220 may train the first model stored in the memory 250. The processor 220 may train the first model by changing at least one of the plurality of parameters. As the processor 220 changes at least one of the plurality of parameters, the first model may be trained to obtain the fourth information including at least one content corresponding to the first information to the third information and the at least one area in which each of the at least one content is to be disposed. The processor 220 may increase a probability that content satisfying the designated condition is to be obtained by training the first model according to a designated condition. An operation of training the first model and obtaining the fourth information including the at least one content and the at least one area based on the trained first model may be described through FIGS. 6A to 6D.

For example, the fourth information may further include configuration information of the at least one area. The processor 220 may obtain the configuration information of the at least one area based on the first model. The configuration information of the at least one area may include a number and/or size of each of the at least one area.

In operation 450, the processor 220 may display the at least one content in each of the at least one area. The operation 450 may correspond to operation 340 of FIG. 3.

Figure 5:
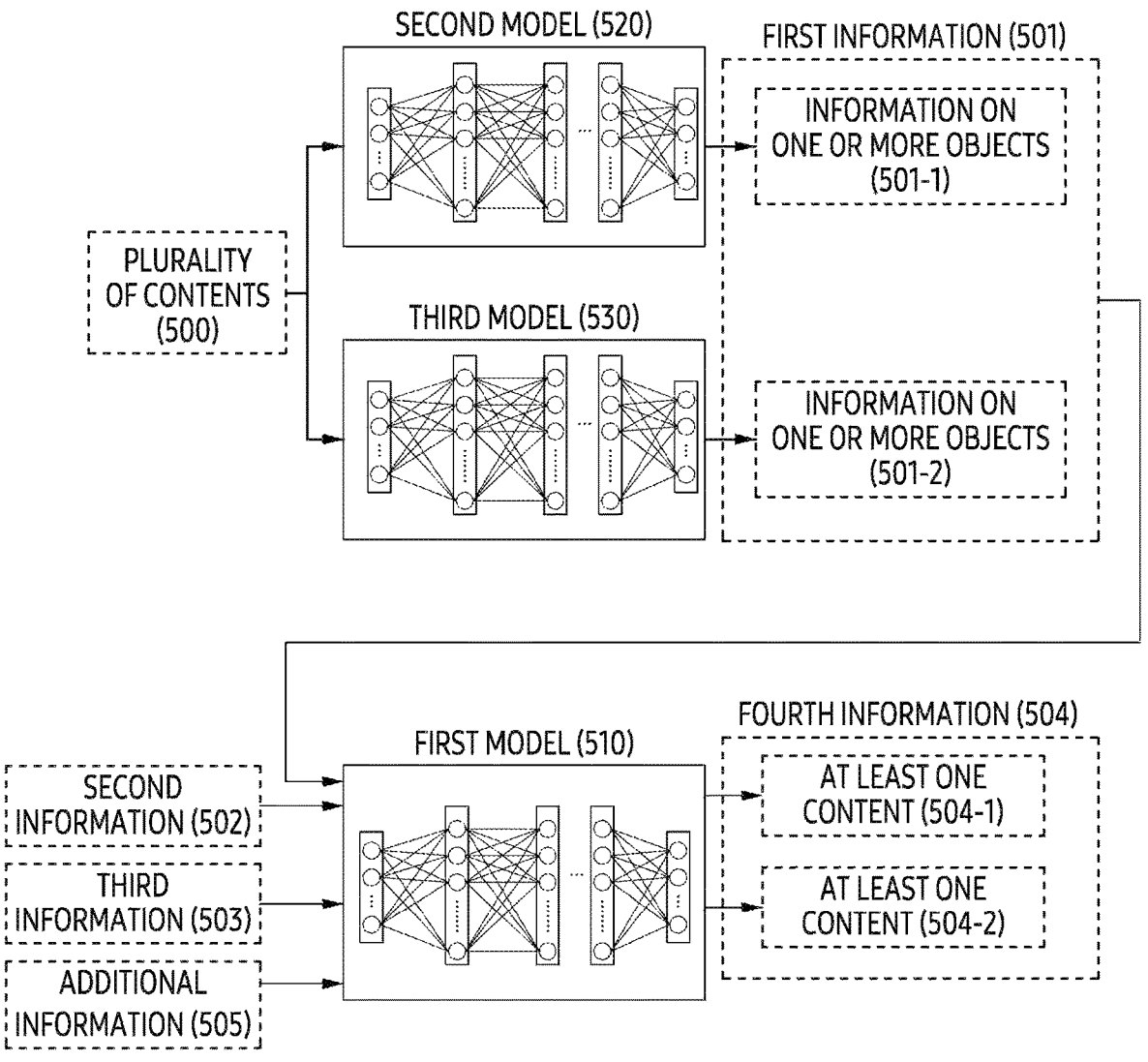
FIG. 5 illustrates an example of an operation of an electronic device according to various embodiments.

FIG. 5 illustrates an example of an operation of an electronic device according to various embodiments.

Referring to FIG. 5, a processor 220 may identify a plurality of contents 500. The processor 220 may identify the plurality of contents 500 by receiving the plurality of contents 500 based on a user input. The processor 220 may identify the plurality of contents 500 stored in a memory 250.

According to an embodiment, the processor 220 may input the plurality of contents 500 to a second model 520. The processor 220 may obtain (or identify) information 501-1 on one or more objects included in each of the plurality of contents 500 from the second model 520. For example, the information 501-1 on the one or more objects included in each of the plurality of contents 500 may include a type of the one or more objects included in each of the plurality of contents 500 and/or the number of the one or more objects included in each of the plurality of contents 500. For example, the processor 220 may obtain (or identify) the type of the one or more objects included in each of the plurality of contents 500 and/or the number of the one or more objects included in each of the plurality of contents 500 from the second model 520.

For example, the processor 220 may identify the one or more objects included in each of the plurality of contents based on the second model 520. The processor 220 may identify the type of the one or more objects based on the second model 520. For example, the processor 220 may divide the one or more objects into a person, an animal, a tree, and/or an ocean based on the second model 520. The processor 220 may identify the number of the one or more objects based on the second model 520. For example, the processor 220 may identify the number of the one or more objects included in each of the plurality of contents.

According to an embodiment, the processor 220 may input the plurality of contents 500 to a third model 530. The processor 220 may obtain information indicating an emotion type for each of the plurality of contents from the third model 530. Although not illustrated, according to an embodiment, the processor 220 may set information obtained based on the second model 520 as input data of the third model 530. For example, based on the second model 520, the processor 220 may obtain information on a face of the person in the content. The processor 220 may identify emotion of the person in the content by setting the obtained information on the face of the person as the input data of the third model 530. The processor 220 may obtain the information indicating the emotion type for the content based on the emotion of the person in the content.

According to an embodiment, first information 501 may include the information 501-1 on one or more objects for each of the plurality of contents and/or information 501-2 indicating an emotion type for each of the plurality of contents. The first information 501 may be used as input data (or input value) of a first model 510. According to an embodiment, the first information 501 may further include information related to the plurality of contents. For example, the first information 501 may further include information on resolution of each of the plurality of contents and information on brightness of each of the plurality of contents.

According to an embodiment, the processor 220 may obtain fourth information 504 from the first model 510 by inputting the first information 501, second information 502, third information 503, and/or additional information 505 to the first model 510. For example, the fourth information 504 may include at least one content 504-1 and at least one area 504-2. The processor 220 may obtain the fourth information 504 including the at least one content 504-1 and the at least one area 504-2 from the first model 510 by inputting the first information 501, the second information 502, the third information 503, and/or the additional information 505 to the first model 510.

For example, the second information 502 may indicate illuminance of an external environment where an electronic device 101 is located. The processor 220 may obtain (or identify) an illuminance value of the external environment where the electronic device 101 is located through a sensor 230 (e.g., an illuminance sensor). The processor 220 may obtain second information 502 indicating the illuminance of the external environment where the electronic device 101 is located.

For example, the third information 503 may be related to a location of a user. The processor 220 may obtain the third information 503 on the location of the user, using a position identification circuit 240. For example, the processor 220 may obtain the third information 503 on the location of the user, using a radar sensor 241 included in the position identification circuit 240. For another example, the processor 220 may obtain the third information 503 on the location of the user, using a communication circuit 320 included in the position identification circuit 240.

For example, the third information 503 may include information indicating a distance between the electronic device 101 and the user and information indicating motion of the user. The processor 220 may obtain the information indicating the distance between the electronic device 101 and the user and the information indicating the motion of the user, using the position identification circuit 240.

For example, the additional information 505 may include information on a size of a display 210 of the electronic device 101 and/or information on a size of an actual object displayed through the display 210. The additional information 505 may be referred to as fifth information.

According to an embodiment, the processor 220 may display the at least one content 504-1 in each of the at least one area 504-2 based on the fourth information 504.

FIG. 6A illustrates an example of information included in first information according to various embodiments.

Referring to FIG. 6A, the first information may include information 601 on resolution, information 602 on brightness, information 603 on the number of objects, information 604 on a type of object, and/or information 605 on an emotion type. A processor 220 may obtain the information 601 on the resolution of each of a plurality of contents, the information 602 on the brightness, the information 603 on the number of the objects, the information 604 on the type of the object, and/or the information 605 on the emotion type, based on a second model and/or a third model.

As illustrated in FIG. 6A, the information 601 on the resolution may represent a resolution for each content. For example, the information 601 on the resolution may be set to one of high definition (HD), full HD (FHD), quad HD (QHD), 4K ultra high definition (4K), and 8K ultra high definition (8K). For example, the processor 220 may obtain the information 601 on the resolution by identifying the resolution of the content as one of the HD, the FHD, the QHD, the 4K, and the 8K. The processor 220 may obtain the information 601 on the resolution for each of the plurality of contents.

The information 602 on the brightness may represent brightness for each content. For example, the information 602 on the brightness may be set to one in a designated range. For example, the processor 220 may obtain the information 602 on the brightness by identifying the brightness of the content as a value from 0 to 10. The processor 220 may obtain the information 602 on the brightness for each of the plurality of contents.

The information 603 on the number of objects may represent the number of objects included in each content. For example, the processor 220 may identify one or more objects included in the content based on the second model. The processor 220 may obtain the information 603 on the number of the one or more objects included in the content. The processor 220 may obtain the information 603 on the number of objects for each of the plurality of contents.

The information 604 on the type of the object may represent the type of the object included in each content. For example, the processor 220 may identify the one or more objects included in the content based on the second model. The processor 220 may obtain the information 604 on the type of the one or more objects included in the content. For example, the processor 220 may divide the one or more objects included in the content into at least one of a person, an animal, a mountain, an ocean, and/or a tree. The processor 220 may obtain the information 604 on the type of the object for each of the plurality of contents.

The information 605 on the emotion type may represent an emotion type for each content. For example, the processor 220 may identify the emotion type for the content based on the third model. For example, according to the third model, the emotion type for the content may be determined based on a color, saturation, and/or brightness of the content. For example, the information 605 on the emotion type for the content may be set to one of happy, sad, calmness, and intense. The processor 220 may obtain the information 605 on the emotion type for each of the plurality of contents.

According to an embodiment, the processor 220 may obtain the first information on a first content among the plurality of contents. The processor 220 may obtain the information 601 on the resolution, the information 602 on the brightness, the information 603 on the number of the objects, the information 604 on the type of the object, and the information 605 on the emotion type, related to the first content. Like the first content, the processor 220 may obtain the first information on all of the plurality of contents, respectively.

According to an embodiment, the processor 220 may train a first model to identify at least one content among the plurality of contents according to the first information. Hereinafter, an embodiment in which the first model is trained based on the first information may be described.

According to an embodiment, the processor 220 may train the first model so that the content is obtained based on at least one of the information 601 on the resolution, the information 602 on the brightness, the information 603 on the number of the objects, the information 604 on the type of the object, and the information 605 on the emotion type.

For example, in case that the number of objects included in the first content is large and resolution of the first content is low, a probability that the first content among the plurality of contents is obtained (or selected) may be reduced. The processor 220 may set a probability to which the first content with a large number of objects and low resolution is to be selected to be low, by changing (or adjusting) a plurality of parameters of the first model. In other words, the processor 220 may set a weight of the first content with the large number of objects and the low resolution, to be low, by changing (or adjusting) the plurality of parameters of the first model.

For another example, in case that the object included in the first content is the person or the animal, and the resolution of the first content is low, a probability that the first content among the plurality of contents is obtained (or selected) may be set to be low. Therefore, in case that the resolution of the first content that the user should specifically recognize is low, the processor 220 may set the probability that the first content is obtained (or selected), to be low, by changing (or adjusting) the plurality of parameters of the first model. For another example, in case that an object included in a second content is the mountain or the ocean, and resolution of the second content is low, a probability that the second content is obtained (or selected) may be set to be high. In case that the object included in the second content is the mountain or the ocean, and the resolution of the second content is low, the processor 220 may set the probability that the second content is obtained (or selected), to be high, by changing (or adjusting) the plurality of parameters of the first model. In other words, in case that resolution required for content displayed in at least one area is high, the probability that the first content including the person or the animal is to be obtained (or selected) may be set to be high.

For another example, in case that the resolution required for the content to be displayed on the display is high, the processor 220 may set a probability that a content with low-resolution is to be obtained, to be low, by changing a plurality of parameters of the first model.

For another example, the processor 220 may determine (or identify) a pool of content to be displayed through the first model, based on the resolution of each of the plurality of contents. The processor 220 may identify more contents than the number of the at least one area. The processor 220 may determine the identified contents as a pool of the contents.

FIG. 6B illustrates an example of information included in second information according to various embodiments.

Referring to FIG. 6B, the second information may indicate illuminance of an external environment where an electronic device is located. The second information may include information 611 on the illuminance. The information 611 on the illuminance may indicate the illuminance of an external environment where an electronic device 101 is located. For example, the information on the illuminance may include an illuminance value (unit: lux) of the external environment where the electronic device 101 is located.

According to an embodiment, a processor 220 may identify the illuminance value of the external environment where the electronic device 101 is located, using a sensor 230. The processor 220 may obtain the information 611 on the illuminance by identifying the illuminance value. According to an embodiment, the processor 220 may receive the illuminance value of the external environment where the electronic device 101 is located from an external device. The processor 220 may obtain the information 611 on the illuminance based on the received illuminance value.

According to an embodiment, the processor 220 may train a first model to identify at least one content among a plurality of contents according to the second information. Hereinafter, an embodiment in which the first model is trained based on the second information may be described.

According to an embodiment, the processor 220 may train the first model so that the content is obtained (or selected) based on the information 611 on the illuminance included in the second information.

For example, in case that the illuminance of the external environment where the electronic device 101 is located is low, the processor 220 may identify a state of a user of the electronic device 101 as a comfortable state. The processor 220 may set a probability that a first content whose emotion type is calm is to be obtained, to be high. In case that the illuminance of the external environment is low, the processor 220 may set a weight of the first content whose emotion type is calm, to be high, by changing (or adjusting) a plurality of parameters of the first model.

For another example, in case that the illuminance of the external environment where the electronic device 101 is located is fast and repeatedly changed, the processor 220 may identify the state of the user of the electronic device 101 as a dynamic state. For example, in case that the illuminance of the external environment where the electronic device 101 is located is fast and repeatedly changed, the processor 220 may identify that the user of the electronic device 101 is partying. The processor 220 may set a probability that a second content whose emotion type is intense is to be obtained, to be high. In case that the illuminance of the external environment where the electronic device 101 is located is fast and repeatedly changed, the processor 220 may set a weight of the second content whose emotion type is intense, to be high, by changing (or adjusting) the plurality of parameters of the first model.

For another example, in case that the illuminance of the external environment where the electronic device 101 is located is high, the processor 220 may set a probability that the first content of a bright color (or a bright tone) is obtained, to be high. In case that the illuminance of the external environment where the electronic device 101 is located is low, the processor 220 may set a probability that the second content of a dark color (or a dark tone) is obtained, to be high. In case that the illuminance of the external environment is high, the processor 220 may set a weight of the first content of the bright color, to be high, by changing the plurality of parameters of the first model. In case that the illuminance of the external environment is low, the processor 220 may set a weight of the second content of the dark color, to be high, by changing the plurality of parameters of the first model.

FIG. 6C illustrates an example of information included in third information according to various embodiments.

Referring to FIG. 6C, the third information may include information 621 indicating a distance between an electronic device 101 and a user and/or information 622 indicating motion of a user.

According to an embodiment, a processor 220 may identify the distance (unit: CM) between the electronic device 101 and the user, using a position identification circuit 240 (e.g., a radar sensor 241 or a communication circuit 242). The processor 220 may obtain the information 621 indicating the distance between the electronic device 101 and the user by identifying the distance between the electronic device 101 and the user. For example, the processor 220 may identify a location of an external electronic device (e.g., a remote controller) used by the user as a location of a user. The processor 220 may obtain the information 621 indicating the distance between the electronic device 101 and the user based on the location of the external electronic device related to the user.

According to an embodiment, the processor 220 may obtain the information 622 indicating the motion of the user, using the position identification circuit 240 (e.g., the radar sensor 241 or the communication circuit 242). The processor 220 may obtain the information 622 indicating the motion of the user, by obtaining a value for the motion of the user, using the position identification circuit 240.

According to an embodiment, the processor 220 may train a first model to identify at least one content among a plurality of contents according to the third information. Hereinafter, an embodiment in which the first model is trained based on the third information may be described.

According to an embodiment, the processor 220 may train the first model so that a content and an area are obtained (or selected) based on the information 621 indicating the distance between the electronic device 101 and the user included in the third information.

For example, the processor 220 may obtain (or determine, select) a size and the number of at least one area obtained through the first model based on the distance between the electronic device 101 and the user. For example, in case that the distance between the electronic device 101 and the user is far, the processor 220 may reduce the number of the at least one area obtained through the first model and may increase resolution of a displayed content. For another example, in case that the distance between the electronic device 101 and the user is close, the processor 220 may increase the number of the at least one area obtained through the first model and may reduce the resolution of the displayed content.

According to an embodiment, the third information may include an azimuth for the location the user relative to the electronic device 101. The processor 220 may identify the azimuth for the location the user relative to the electronic device 101. The processor 220 may divide the at least one area based on the azimuth. A first area and a second area among the at least one area may be divided based on the azimuth for the location the user. The processor 220 may configure a size of the first area, which is related to the direction formed based on the azimuth, to be smaller than a size of the second area.

For example, the processor 220 may identify that the user is located on a left side of the electronic device 101. The processor 220 may set the size of the first area, which is close to the user to be smaller than the size of the second area, which is far away from the user. The processor 220 may dispose a content with low-resolution in the first area. The processor 220 may dispose a content with high-resolution in the second area.

For another example, the processor 220 may identify that the user is located on the left side of the electronic device 101. The processor 220 may set the size of the first area, which is close to the user to be larger than the size of the second area, which is far from the user. The processor 220 may dispose the content with high-resolution in the first area. The processor 220 may dispose the content with low-resolution in the second area.

According to an embodiment, the processor 220 may train the first model so that the content and the area are obtained (or selected) based on the information 622 indicating the motion of the user included in the third information. For example, the processor 220 may identify emotion of the user based on the information 622 indicating the motion of the user. The processor 220 may train the first model so that a content according to the emotion of the user and an area for displaying the content is obtained.

For example, in case that a value for the motion of the user is low, the processor 220 may identify a state of a user of the electronic device 101 as a comfortable state. The processor 220 may set a probability that a first content whose emotion type is calm is to be obtained, to be high. In case that the value for the motion of the user is high, the processor 220 may set a weight of the first content whose emotion type is calm to be high, by changing (or adjusting) a plurality of parameters of the first model.

According to an embodiment, the processor 220 may train the first model based on the information 622 indicating the motion of the user and information 611 on illuminance. For example, in case that the value for the motion of the user is low and the illuminance is low, the state of the user may be identified as the comfortable state. The processor 220 may set the probability that the first content whose emotion type is calm is to be obtained, to be high. For another example, in case that the value for the motion of the user is high and the illuminance changes fast, it may be identified that the user is partying. The processor 220 may set a probability that a second content whose emotion type is intense is to be obtained, to be high.

FIG. 6D illustrates an example of information included in additional information according to various embodiments.

Referring to FIG. 6D, the additional information may include information 631 on a size of a display 210 of an electronic device 101 and information 632 on a size of an actual object displayed through the display 210. For example, the additional information may be referred to as fifth information.

According to an embodiment, the information 631 on the size of the display 210 may be a state stored in a memory 250 of the electronic device 101. The information 631 on the size of the display 210 may be stored in the memory 250 as configuration information of the electronic device 101. For example, a processor 220 may identify a size value (unit: inch) of the display 210 of the electronic device 101. The processor 220 may obtain the information 631 on the size of the display 210 based on identifying the size value of the display 210.

According to an embodiment, the information 632 on the size of the actual object displayed through the display 210 may be set based on the information 631 on the size of the display 210. For example, as the size of the display 210 is larger, the size of the actual object displayed on the display 210 having the same resolution may also be displayed larger. The processor 220 may identify a size value (unit: cm^2) of the actual object displayed through the display 210 based on identifying the size value of the display 210. The processor 220 may obtain the information 632 on the size of the actual object displayed through the display 210 based on identifying a size value of the actual object displayed through the display 210.

According to an embodiment, the processor 220 may train a first model so that a content and an area are obtained based on the information 631 on the size of the display 210 and the information 632 on the size of the actual object displayed through the display 210.

For example, in case that the size of the display 210 is small, the processor 220 may set a probability that a first content with high-resolution is to be obtained, to be low. In case that the size of the display 210 is small, the processor 220 may set a weight of the first content with high-resolution to be low by changing a plurality of parameters of the first model.

For another example, in case that the size of the display 210 is large, the processor 220 may set resolution of a second content with high-resolution to be low. Thus, in case that the size of the display 210 is large, the processor 220 may display the second content in a smaller size by lowering and displaying the resolution of the second content. In other words, the processor 220 may determine (or identify) resolution of the content by correcting dots per inch (DPI) based on the size of the display 210.

Referring to FIGS. 6A to 6D, the processor 220 may obtain fourth information including at least one content to be displayed on the display 210 among the plurality of contents and at least one area in which each of the at least one content is to be disposed, by inputting the first information, the second information, the third information and/or the additional information (or the fifth information) into the first model.

For example, the processor 220 may identify the number of the at least one area, a location of at least one content disposed in the at least one area, and/or resolution of the at least one content, by obtaining the fourth information. For another example, the processor 220 may change (or correct) the resolution of the at least one content so that it is displayed at a constant DPI according to the size of the display 210, based on the fourth information.

Figure 7:
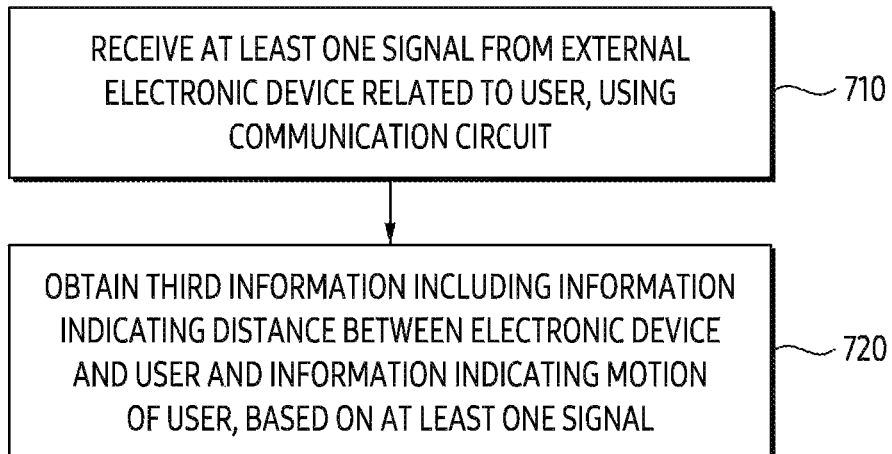
FIG. 7 is a flowchart illustrating another operation of an electronic device according to various embodiments.

FIG. 7 is a flowchart illustrating another operation of an electronic device according to various embodiments. This method may be executed by an electronic device 101 and a processor 220 of the electronic device 101 illustrated in FIGS. 1 and 2.

Referring to FIG. 7, operations 710 and 720 may be related to operation 430 of FIG. 4. In operation 710, the processor 220 may receive at least one signal from an external electronic device related to a user, using a communication circuit 242. For example, the external electronic device may be in use by the user. For example, the external electronic device may operate by being worn by the user.

According to an embodiment, the at least one signal received from the external electronic device may include information on a location of the external electronic device. For example, the at least one signal may include information on a location according to a global navigation satellite system (GNSS) of the external electronic device. For another example, the at least one signal may include information on a location of the external electronic device obtained through a sensor of the external electronic device.

According to an embodiment, the at least one signal may be a response signal to signals transmitted from the electronic device 101. The at least one signal may include information on a time for processing the at least one signal.

In operation 720, the processor 220 may obtain third information including information indicating a distance between the electronic device 101 and the user and information indicating motion of the user, based on the at least one signal.

For example, the processor 220 may obtain the information indicating the distance between the electronic device 101 and the user, based on information on a location of the external electronic device included in the at least one signal. For another example, the processor 220 may obtain the information indicating the distance between the electronic device 101 and the user, based on the information on the time for processing the at least one signal included in the at least one signal. For example, the processor 220 may identify a transmission time of the signals transmitted from the electronic device 101 and a reception time of the at least one signal. The processor 220 may obtain the information on the distance between the electronic device 101 and the user, based on the transmission time, the reception time, and the time for processing.

For another example, the processor 220 may obtain the information indicating the motion of the user, based on a change in the location of the external electronic device. In a state that the electronic device 101 is fixed, the processor 220 may identify that the distance between the electronic device 101 and the user (or the external electronic device) is changed. The processor 220 may obtain the information indicating the motion of the user based on that the distance between the electronic device 101 and the user is changed.

Figure 8:
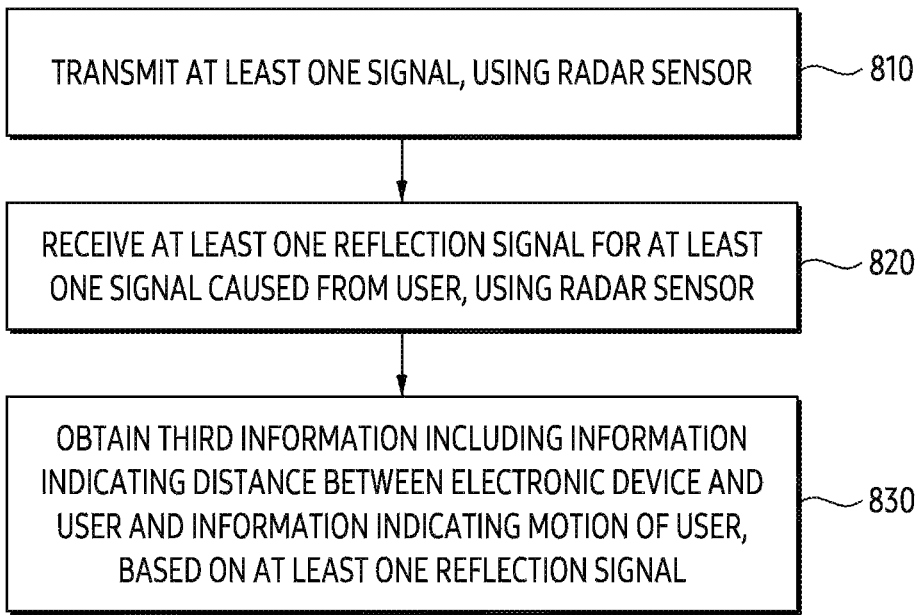
FIG. 8 is a flowchart illustrating another operation of an electronic device according to various embodiments.

FIG. 8 is a flowchart illustrating another operation of an electronic device according to various embodiments. This method may be executed by an electronic device 101 and a processor 220 of the electronic device 101 illustrated in FIGS. 1 and 2.

Referring to FIG. 8, operations 810 and 830 may be related to operation 430 of FIG. 4. Referring to operation 810, the processor 220 may transmit at least one signal, using a radar sensor 241. The processor 220 may transmit the at least one signal, using the radar sensor 241 to identify an external object around the electronic device 101.

In operation 820, the processor 220 may receive at least one reflection signal for at least one signal caused from a user, using the radar sensor 241.

According to an embodiment, the at least one signal may be caused from the user. The at least one signal may be reflected from the user. The processor 220 may receive the at least one reflection signal in which the at least one signal is reflected from the user.

In operation 830, the processor 220 may obtain third information including information indicating a distance between the electronic device 101 and the user and information indicating motion of the user, based on the at least one reflection signal.

For example, the processor 220 may identify a transmission timing of the at least one signal. The processor 220 may identify a reception timing of the at least one reflection signal. The processor 220 may identify the distance between the electronic device 101 and the user, based on the transmission timing of the at least one signal and the reception timing of the at least one reflection signal. The processor 220 may obtain the information indicating the distance between the electronic device 101 and the user by identifying the distance between the electronic device 101 and the user. The processor 220 may identify that the distance between the electronic device 101 and the user is changed. The processor 220 may identify a value for the motion of the user, based on that the distance between the electronic device 101 and the user is changed. The processor 220 may obtain the information indicating the motion of the user based on identifying the value for the motion of the user.

Figure 9:
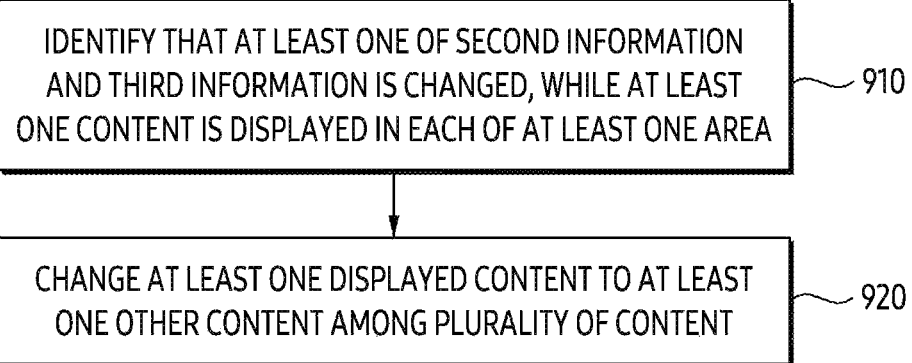
FIG. 9 is a flowchart illustrating another operation of an electronic device according to various embodiments.

FIG. 9 is a flowchart illustrating another operation of an electronic device according to various embodiments. This method may be executed by an electronic device 101 and a processor 220 of the electronic device 101 illustrated in FIGS. 1 and 2.

In operation 910, the processor 220 may identify that at least one of second information and third information is changed, while at least one content is displayed in each of at least one area.

For example, the processor 220 may identify that illuminance of an external environment where the electronic device 101 is located is changed. The processor 220 may change (or update) the second information, based on identifying that the illuminance of the external environment where the electronic device 101 is located is changed.

For another example, the processor 220 may identify that a distance between the electronic device 101 and a user is changed, using a position identification circuit 240. The processor 220 may change (or update) the third information based on identifying that the distance between the electronic device 101 and the user is changed.

For another example, the processor 220 may identify that a value for motion of the user is changed, using the position identification circuit 240. The processor 220 may change the third information, based on identifying that the value for the motion of the user is changed.

In operation 920, the processor 220 may change at least one displayed content to at least one other content among a plurality of contents. For example, the processor 220 may change the at least one displayed content to the at least one other content among the plurality of contents, based on identifying that the at least one of the second information and the third information is changed.

According to an embodiment, the processor 220 may identify at least one other content to be displayed on a display 210 and at least one other area in which each of the at least one other content is to be disposed, among the plurality of contents from the first model, by inputting the changed second information or the changed third information to the first model, based on that the at least one of the second information and the third information is changed. The processor 220 may change at least one content displayed on the display 210 to the at least one other content among the plurality of contents.

For example, the processor 220 may increase a size of a first area among the at least one area, based on identifying that the distance between the electronic device 101 and the user has increased. For another example, the processor 220 may change the contents displayed on the display 210 from at least one content with a bright color to at least one content with a dark color, based on identifying that the illuminance of the external environment where the electronic device 101 is located has decreased.

Figure 10:
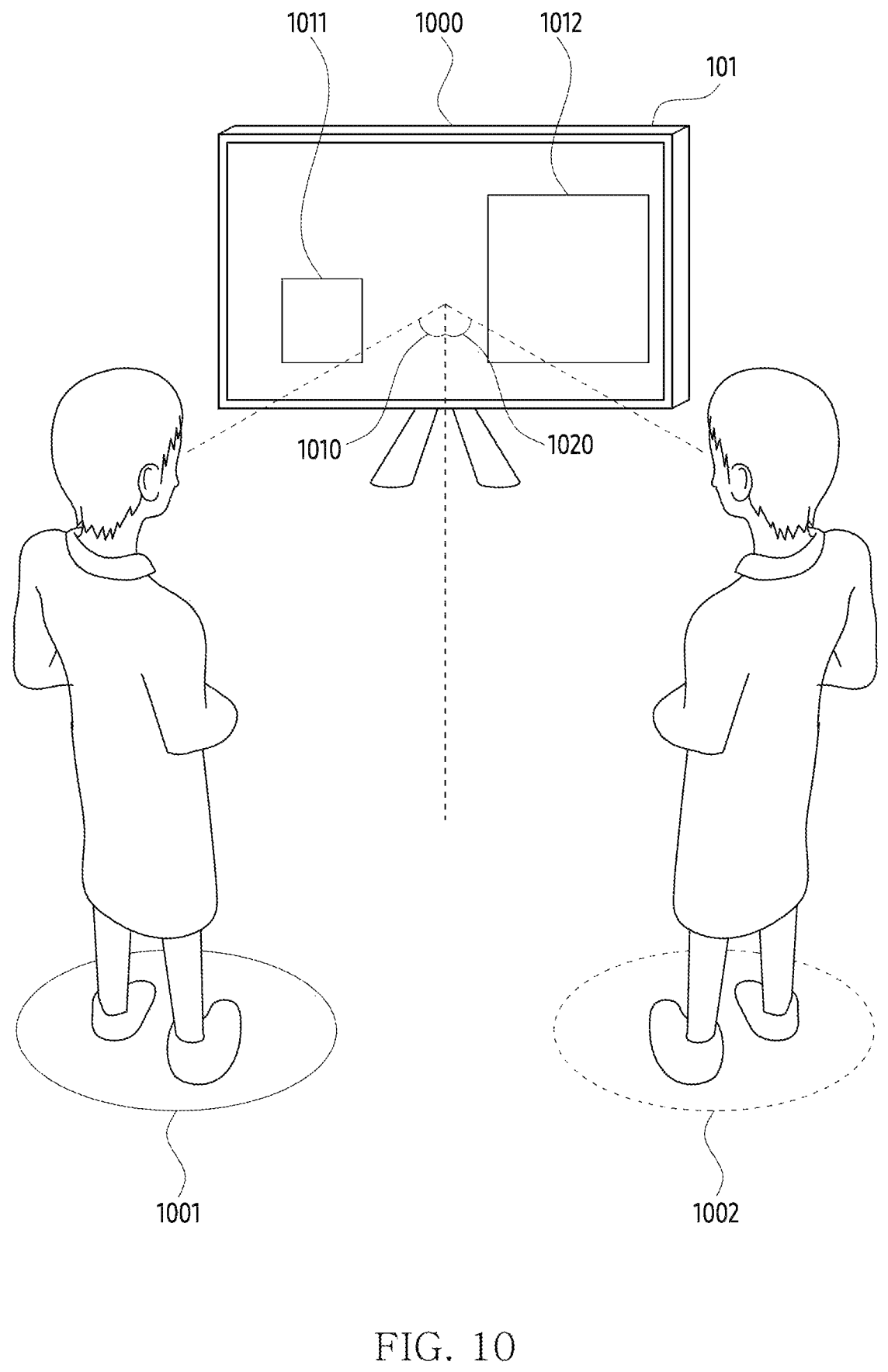

FIG. 10 illustrates another operation of an electronic device according to various embodiments.

Referring to FIG. 10, a processor 220 of an electronic device 101 may identify that a user is located at a first location 1001, using a position identification circuit 240. The processor 220 may obtain third information including an azimuth for the first location 1001 of the user, based on the electronic device 101, using the position identification circuit 240. For example, the processor 220 may identify the azimuth for the first location 1001 of the user as a first angle 1010, based on the electronic device 101, using the position identification circuit 240.

The processor 220 may identify that the electronic device 101 is on the right side relative to the user, based on that the azimuth is the first angle 1010. The processor 220 may configure a size of a first area 1011 configured on a left side in a screen 1000 to be smaller than a second area 1012 configured on a right side in the screen 1000.

According to an embodiment, the processor 220 may identify that a location of a user of the electronic device 101 is changed from the first location 1001 to a second location 1002. The processor 220 may identify an azimuth for the second location 1002 as a second angle 1020 relative to the electronic device 101, based on identifying that the location of the user is changed from the first location 1001 to the second location 1002. The processor 220 may identify that the electronic device 101 is on the left side relative to the user, based on that the azimuth is the second angle 1020. The processor 220 may change a size of the second area 1012 configured on the right side in the screen 1000 to be smaller than the first area 1011 configured on the left side in the screen 1000.

An electronic device according to various embodiments may comprise a display, an illuminance sensor, a position identification circuit for identifying a position of a user, a memory storing a plurality of contents; and at least one processor operably coupled with the display, the illuminance sensor, the position identification circuit, and the memory. The at least one processor may be configured to identify, from the memory, first information including information on one or more objects comprised in each of the plurality of contents and information indicating an emotion type for each of the plurality of contents. The at least one processor may be configured to obtain, using the illuminance sensor, second information indicating illuminance of an external environment where the electronic device located. The at least one processor may be configured to obtain, using the position identification circuit, third information on the position of the user. The at least one processor may be configured to, by inputting the first information, the second information, and the third information to a first model indicated by a plurality of parameters, stored in the memory, obtain, from the first model, fourth information including at least one content to be displayed on the display among the plurality of contents and at least one area in which each of the at least one content is to be disposed. The at least one processor may be configured to display, based on the fourth information, the at least one content on each of the at least one area.

According to an embodiment, the at least one processor may be further configured to identify that at least one of the second information and the third information is changed while the at least one content is displayed on each of the at least one area. The at least one processor may be configured to, based on identifying that the at least one of the second information and the third information is changed, change the at least one content which is displayed to at least one other content among the plurality of contents.

According to an embodiment, the at least one processor may be configured to receive the plurality of contents from an external electronic device connected to the electronic device. The at least one processor may be configured to store the received plurality of contents in the memory.

According to an embodiment, the first information may further include resolution for each of the plurality of contents and brightness for each of the plurality of contents.

According to an embodiment, the at least one processor may be further configured to obtain information on one or more objects included in each of the plurality of contents form the second model, by inputting the plurality of images to a second model distinct to the first model.

According to an embodiment, the information on the one or more objects comprised in each of the plurality of contents may include a type of the one or more objects comprised in each of the plurality of contents and the number of the one or more objects comprised in each of the plurality of contents.

According to an embodiment, the at least one processor may be configured to obtain the information indicating the emotion type for each of the plurality of contents, by inputting the plurality of images to a third model distinct to the first model and the second model.

According to an embodiment, the at least one processor may be configured to obtain the fourth information by inputting, to the first model, fifth information including a size of the display and a size of at least one content displayed based on the size of the display, with the first information, the second information, and the third information.

According to an embodiment, the position identification circuit may comprise a communication circuit. The at least one processor may be configured to receive, using the communication circuit, at least one signal form external electronic device related to the user. The at least one processor may be configured to, based on the received at least one signal, obtain the third information including information indicating a distance between the electronic device and the user and information indicating a motion of the user.

According to an embodiment, the position identification circuit may comprise a radar sensor. The at least one processor may be configured to transmit at least one signal using the radar sensor. The at least one processor may be configured to receive, using the radar sensor, a least one reflection signal related to the at least one sensor caused by the user. The at least one processor may be configured to, based on the at least one reflection signal, obtain the third information including information indicating a distance between the electronic device and the user and information indicating a motion of the user.

According to an embodiment, the at least one processor may be configured to obtain the third information including azimuth of a location of the user relative to the electronic device using the position identification circuit. A first area and a second area among the at least one area may be divided based on the azimuth of the location of the user, and a size of the first area, which is related to a direction formed based on the azimuth, may be configured to be larger than the size of the second area.

According to an embodiment, the at least one processor may be further configured to train the first model by changing the plurality of parameters to reduce the number of the at least one area as a distance between the electronic device and the user increases.

A method of an electronic device according to an embodiment may comprise identifying, from a memory, first information including information on one or more objects comprised in each of the plurality of contents and information indicating an emotion type for each of the plurality of contents. The method may comprise obtaining, using an illuminance sensor, second information indicating illuminance of an external environment where the electronic device located. The method may comprise obtaining, using a position identification circuit, third information on the position of the user. The method may comprise, by inputting the first information, the second information, and the third information to a first model indicated by a plurality of parameters, stored in the memory, obtaining, from the first model, fourth information including at least one content to be displayed on a display among the plurality of contents and at least one area in which each of the at least one content is to be disposed. The method may comprise displaying, based on the fourth information, the at least one content on each of the at least one area.

According to an embodiment, the method may comprise identifying that at least one of the second information and the third information is changed while the at least one content is displayed on each of the at least one area. According to an embodiment, the method may comprise, based on identifying that the at least one of the second information and the third information is changed, changing the at least one content which is displayed to at least one other content among the plurality of contents.

According to an embodiment, the first information may further comprise resolution for each of the plurality of contents and brightness for each of the plurality of contents.

According to an embodiment, the method may further comprise obtaining information on one or more objects included in each of the plurality of contents form the second model, by inputting the plurality of images to a second model distinct to the first model.

According to an embodiment, the information on the one or more objects comprised in each of the plurality of contents may include a type of the one or more objects comprised in each of the plurality of contents and the number of the one or more objects comprised in each of the plurality of contents.

According to an embodiment, the method may comprise obtaining the information indicating the emotion type for each of the plurality of contents, by inputting the plurality of images to a third model distinct to the first model and the second model.

According to an embodiment, the method may comprise training the first model by changing the plurality of parameters to reduce the number of the at least one area as a distance between the electronic device and the user increases.

Non-transitory computer readable storage medium according to various embodiments may store one or more programs. The one or more programs, when being executed by a processor of an electronic device with a display, an illuminance sensor, and a position identification circuit, may comprise instructions causing the electronic device to identify, from the memory, first information including information on one or more objects comprised in each of the plurality of contents and information indicating an emotion type for each of the plurality of contents. The one or more programs, when being executed by the processor of the electronic device, may comprise instructions causing the electronic device to obtain, using the illuminance sensor, second information indicating illuminance of an external environment where the electronic device located. The one or more programs, when being executed by the processor of the electronic device, may comprise instructions causing the electronic device to obtain, using the position identification circuit, third information on the position of the user. The one or more programs, when being executed by the processor of the electronic device, may comprise instructions causing the electronic device to, by inputting the first information, the second information, and the third information to a first model indicated by a plurality of parameters, stored in the memory, obtain, from the first model, fourth information including at least one content to be displayed on the display among the plurality of contents and at least one area in which each of the at least one content is to be disposed. The one or more programs, when being executed by the processor of the electronic device, may store one or more programs comprising instructions causing the electronic device to display, based on the fourth information, the at least one content on each of the at least one area.

Functions related to artificial intelligence according to the present disclosure may operate on a processor and a memory. The processor may include one or more processors. In this context, the one or more processors may be a general-purpose processor such as e.g., a central processing unit (CPU), an application processor (AP), a digital signal processor (DSP) or the like, a graphics dedicated processor such as e.g., a GPU, a vision processing unit (VPU), or an artificial intelligence (AI) dedicated processor such as a neural processing unit (NPU). The one or more processors may control to process input data according to a predefined operation rule or an artificial intelligence model stored in the memory. Alternatively, when the one or more processors are of an AI-dedicated processor, the AI-dedicated processor may be designed with a hardware structure specialized for processing a certain AI model.

Such a predefined action rule or artificial intelligence model is characterized in that it is made based on learning. Here, being made based on the learning may imply that a basic artificial intelligence model is learned using a plurality of learning data by means of a learning algorithm, so that it is to be made a predefined action rule or an artificial intelligence model configured to perform a desired characteristic (or purpose). Such learning may be performed on an apparatus itself on which the artificial intelligence according to the present disclosure is performed, or may be performed on a separate server and/or a system. Examples of the learning algorithm may include supervised learning, unsupervised learning, semi-supervised learning, or reinforcement learning, although not limited thereto.

An artificial intelligence model may be configured with a plurality of neural network layers. Each of the plurality of neural network layers may have a plurality of weight values, and may perform a neural network operation through operations between an operational result of a previous layer and a plurality of weight values. The plurality of weights of the plurality of neural network layers may be optimized by a result of learning from an artificial intelligence model. For example, a plurality of weights may be updated so that a loss value or a cost value obtained from the artificial intelligence model during the learning process is reduced or minimized. Examples of the artificial neural network may include, for example, a convolutional neural network (CNN), a deep neural network (DNN), a recurrent neural network (RNN), a restricted Boltzmann machine (RBM), a deep belief network (DBN), a bidirectional recurrent deep neural network (BRDNN), or deep Q-networks, although it is not limited thereto.

In a method for configuring a screen based on obtained information of an electronic device according to the present disclosure, output data recognizing an image or one or more objects or an emotion type in the image may be obtained, by using the plurality of contents as input data of an artificial intelligence model, as a method for recognizing information on each of a plurality of contents. An AI model may be created through learning. Here, when an AI model is created through learning, it will imply that a basic artificial intelligence model is learned using a plurality of learning data by a certain learning algorithm, so as to render a predefined action rule or artificial intelligence model set to perform a desired characteristic (or purpose). An artificial intelligence model may be configured with a plurality of neural network layers. Each of the plurality of neural network layers may have a plurality of weight values, and perform a neural network operation by means of operation between an operation result of a previous layer and the plurality of weight values.

Linguistic understanding may be one of advanced techniques of recognizing and applying/processing human language/character, and may include a natural language processing, a machine translation, a dialog system, a question answering, a speech recognition/synthesis, and the like.

In a method for configuring a screen based on the obtained information of the electronic device according to the present disclosure, the artificial intelligence model may be used to recommend/execute at least one content and at least one area using the plurality of contents as a method for inferring or predicting information on each of the plurality of contents. At least one processor may perform a pre-processing process on the data to convert it into a form suitable for use as an input to the artificial intelligence model. AI models may be created through learning. Here, the AI model being created through learning will imply that a basic artificial intelligence model is learned using a plurality of learning data by a certain learning algorithm, so as to create a predefined action rule or artificial intelligence model established to perform a desired characteristic (or purpose). The artificial intelligence model may be configured with a plurality of neural network layers. Each of the plurality of neural network layers may have a plurality of weight values, and may perform a neural network operation through operations between an operation result of a previous layer and the plurality of weight values.

Inference prediction may be one of advance techniques for judging information for making logical reasoning and prediction, and include knowledge/probability-based reasoning, optimization prediction, preference-based planning, recommendation, and so on.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," or "connected with" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between a case in which data is semi-permanently stored in the storage medium and a case in which the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

No claim element is to be construed under the provisions of 35 U.S.C. § 112, sixth paragraph, unless the element is expressly recited using the phrase "means for" or "means".

What is claimed is:

1. A method performed by an electronic device, the method comprising:

obtaining, via communication circuitry of the electronic device, a plurality of contents from an external electronic device, based on obtaining the plurality of contents, identifying first information related to the plurality of contents, the first information including information indicating one or more objects included in each of a plurality of contents, information indicating an emotion type for each of the plurality of contents, and information indicating resolution for each of the plurality of contents and brightness for each of the plurality of contents, obtaining, using an illuminance sensor, second information indicating illuminance of an external environment where the electronic device is located, obtaining, using position identification circuitry of the electronic device, third information indicating a position of a user, based on inputting the first information, the second information, and the third information to a first artificial intelligence (AI) model, determining at least one content to be displayed on a display of the electronic device among the plurality of contents and a layout for the at least one content including at least one area in which each of the at least one content is to be disposed, and displaying the at least one content according to the determined layout.

2. The method of claim 1, wherein the method further comprises:

identifying that at least one of the second information and the third information is changed while the at least one content is displayed in the at least one area on the display, and based on identifying that at least one of the second information and the third information is changed, changing the at least one content which is displayed to at least one other content among the plurality of contents.

3. The method of claim 1, wherein the method further comprises:

receiving the plurality of contents from the external electronic device connected to the electronic device, and storing the received plurality of contents in memory of the electronic device.

4. The method of claim 1, wherein the method further comprises:

obtaining information indicating one or more objects included in each of the plurality of contents, by inputting a plurality of images to a second AI model distinct to the first AI model.

5. The method of claim 4, wherein the information indicating the one or more objects included in each of the plurality of contents includes information indicating a type of the one or more objects included in each of the plurality of contents and a number of the one or more objects included in each of the plurality of contents.

6. The method of claim 4, wherein the method further comprises:

obtaining the information indicating the emotion type for each of the plurality of contents, by inputting the plurality of images to a third AI model distinct to the first model and the second AI model.

7. An electronic device comprising:
a display;
communication circuitry;
an illuminance sensor;
position identification circuitry for identifying a position of a user;
memory, including one or more storage media, storing instructions; and
at least one processor including processing circuitry, wherein the instructions, when executed by the at least one processor individually or collectively, cause the electronic device to:

obtain, via the communication circuitry, a plurality of contents from an external electronic device, based on obtaining the plurality of contents, identify first information related to the plurality of contents, the first information including information indicating one or more objects included in each of the plurality of contents, information indicating an emotion type for each of the plurality of contents, and information indicating resolution for each of the plurality of contents and brightness for each of the plurality of contents, obtain, using the illuminance sensor, second information indicating illuminance of an external environment where the electronic device is located, obtain, using the position identification circuitry, third information indicating the position of the user, based on inputting the first information, the second information, and the third information to a first artificial intelligence (AI) model, determine at least one content to be displayed on the display among the plurality of contents and a layout for the at least one content including at least one area in which the at least one content is to be disposed, and display, via the display, the at least one content according to the determined layout.

8. The electronic device of claim 7, wherein the instructions, when executed by the at least one processor individually or collectively, cause the electronic device to:

identify that at least one of the second information and the third information is changed while the at least one content is displayed in the at least one area on the display, and based on identifying that at least one of the second information and the third information is changed, change the at least one content which is displayed to at least one other content among the plurality of contents.

9. The electronic device of claim 7, wherein the instructions, when executed by the at least one processor individually or collectively, cause the electronic device to:

receive the plurality of contents from the external electronic device connected to the electronic device, and store the received plurality of contents in the memory.

10. The electronic device of claim 7, wherein the instructions, when executed by the at least one processor individually or collectively, cause the electronic device to:

obtain information indicating one or more objects included in each of the plurality of contents, by inputting a plurality of images to a second AI model distinct to the first AI model.

11. The electronic device of claim 10, wherein the information indicating the one or more objects included in each of the plurality of contents includes information indicating a type of the one or more objects included in each of the plurality of contents and a number of the one or more objects included in each of the plurality of contents.

12. The electronic device of claim 10, wherein the instructions, when executed by the at least one processor individually or collectively, cause the electronic device to:

obtain the information indicating the emotion type for each of the plurality of contents, by inputting the plurality of images to a third AI model distinct to the first AI model and the second AI model.

13. The electronic device of claim 7, wherein the instructions, when executed by the at least one processor individually or collectively, cause the electronic device to:

obtain fourth information indicating the at least one content and the layout by inputting, to the first AI model, fifth information indicating a size of the display and a size of at least one content displayed based on the size of the display, with the first information, the second information, and the third information.

14. The electronic device of claim 7, wherein the instructions, when executed by the at least one processor individually or collectively, cause the electronic device to:

receive, using the communication circuitry, at least one signal from an external device related to the user, and based on the received at least one signal, obtain the third information including information indicating a distance between the electronic device and the user and information indicating a motion of the user.

15. The electronic device of claim 7, wherein the position identification circuitry includes a radar sensor, and the instructions, when executed by the at least one processor individually or collectively, cause the electronic device to:

transmit at least one signal using the radar sensor, receive, using the radar sensor, at least one reflection signal caused by the user, and based on the at least one reflection signal, obtain the third information including information indicating a distance between the electronic device and the user and information indicating a motion of the user.

16. The electronic device of claim 7, wherein the instructions, when executed by the at least one processor individually or collectively, cause the electronic device to:

obtain the third information indicating azimuth of a location of the user relative to the electronic device, using the position identification circuitry, a first area and a second area among the at least one area are divided based on the azimuth of the location of the user, and a size of the first area, which is related to a direction formed based on the azimuth, is larger than a size of the second area.

17. The electronic device of claim 7, wherein the instructions, when executed by the at least one processor individually or collectively, cause the electronic device to:

train the first AI model by changing a plurality of parameters to reduce a number of the at least one area as a distance between the electronic device and the user increases.

18. Non-transitory computer readable storage medium storing one or more programs, wherein the one or more programs which, when being executed by a processor of an electronic device with a display, communication circuitry, an illuminance sensor, and a position identification circuitry, include instructions causing the electronic device to:

obtain, via the communication circuitry, a plurality of contents from an external electronic device, based on obtaining the plurality of contents, identify first information related to the plurality of contents, the first information including information indicating one or more objects included in each of the plurality of contents, information indicating an emotion type for each of the plurality of contents, and information indicating resolution for each of the plurality of contents and brightness for each of the plurality of contents, obtain, using the illuminance sensor, second information indicating illuminance of an external environment where the electronic device is located, obtain, using the position identification circuitry, third information on a position of a user, based on inputting the first information, the second information, and the third information to a first artificial intelligence (AI) model, determine at least one content to be displayed on the display among the plurality of contents and a layout for the at least one content including at least one area in which each of the at least one content is to be disposed, and display, via the display, the at least one content according to the determined layout.

* * * * *